United States Patent [19]

Oesterle et al.

[11] Patent Number: 4,626,699
[45] Date of Patent: Dec. 2, 1986

[54] PULSE GENERATOR

[75] Inventors: Hermann F. Oesterle, Lauf; Wolfgang Rosl, Eckental; Jochen Rose, Rothenbach, all of Fed. Rep. of Germany

[73] Assignee: International Standard Electric Corporation, New York, N.Y.

[21] Appl. No.: 669,691

[22] Filed: Nov. 8, 1984

[30] Foreign Application Priority Data

Nov. 11, 1983 [DE] Fed. Rep. of Germany ....... 3340843

[51] Int. Cl.[4] .............................................. H03K 3/00
[52] U.S. Cl. ..................................... 307/106; 307/96; 307/132 R; 318/325; 324/180; 200/30 R; 200/153 L
[58] Field of Search ................... 307/96, 106, 132, 43; 318/325, 602; 324/160, 179, 180; 200/4, 6, 11, 19, 20, 21, 27 R, 27 B, 30 R, 80, 80 A, 80 B, 153 L, 153 LA, 153 LB, 153 N, 153 P, 155 R

[56] References Cited

U.S. PATENT DOCUMENTS

| 1,405,338 | 1/1922 | Schön | 307/96 X |
| 3,147,425 | 9/1964 | Christoff | 307/106 |
| 3,358,213 | 12/1967 | Sletback et al. | 307/96 X |
| 3,535,476 | 10/1970 | Waznys t al. | 200/153 P X |
| 3,964,456 | 6/1976 | Eshelman | 200/31 CA X |
| 4,207,770 | 6/1980 | Grushow | 200/153 N X |
| 4,238,654 | 12/1980 | Hermle | 200/153 LB |
| 4,518,832 | 5/1985 | Geremia | 200/4 |

FOREIGN PATENT DOCUMENTS 604490  5/1960  Italy ..................... 307/96

OTHER PUBLICATIONS

A Simple Mechanically Operated Subnanosecond Rise-Time Generator for Pulses Up to 100kv., J. Phys. E. (G.B) vol. 4, No. 2, (Feb. 1971).

Primary Examiner—William M. Shoop, Jr.
Assistant Examiner—Shikluen Paul Ip
Attorney, Agent, or Firm—Donald J. Lenkszus

[57] ABSTRACT

An electromechanical pulse generator includes a toothed disk driven by a rotating shaft to operate two pairs of contacts to generate one pulse output and one direction-of-rotation output. The pulse contacts and the direction-of-rotation contacts operate independently of each other. The toothed disk is rotatable and axially displaceable. The axial displacement is dependent on the direction of rotation via an inclined plane in the form of a screw thread which is rotatable by the rotary shaft. By axial displacement of the toothed disk, the direction of rotation of the shaft is detected, and by rotation of the toothed disk, the pulses are generated.

20 Claims, 2 Drawing Figures

PULSE GENERATOR

BACKGROUND OF THE INVENTION

The present invention pertains to an electromechanical pulse generator. More specifically, the invention pertains to an electromechanical pulse generator of the type having a toothed disk which is capable of being driven via a rotating shaft and which actuates two pair of contacts to detect the direction of rotation of the shaft.

One such pulse generator is known from the German published patent application DE-OS No. 3,136,598. In that pulse generator the contact assembly comprises two pairs of contacts which are disposed on leaf or flat springs extending parallel to each other. In this contact assembly, the moving contacts are disposed on a middle flat or leaf spring which, at its projecting end engages with its circular end member into a spur gear toothing. By turning the spur gear, the flat or leaf spring is swiveled toward either one or the other side depending on the direction of rotation, moving against a contact provided for the respective direction of rotation and the generation of pulses. Upon further rotation, the end of the spring finally jumps back into the next toothing space causing the contact to be opened. This defines the direction because each of the contacts is associated with one particular direction of rotation.

SUMMARY OF THE INVENTION

It is one object of the invention to provide a pulse generator which generates one pulse output and one direction-of-rotation output, so that both the pulse contacts and the direction-of-rotation contacts operate independently of each other. Further objects of the invention are that the pulse generator be of compact design and capable of being manufactured in a cost effective manner.

These and other objects are achieved by a pulse generator in accordance with the principles of the invention in which the toothed disk is rotatable and axially displaceable. The axial displacement is dependent on the direction of rotation via an inclined plane which is rotatable by the rotary shaft. By axial displacement of the toothed disk, the direction of rotation of the shaft is detected, and by rotation of the toothed disk, the pulses are generated. Only one pulse contact is required.

BRIEF DESCRIPTION OF THE DRAWING

The invention will be better understood from a reading of the following detailed description in conjunction with the drawing in which.

DETAILED DESCRIPTION

Figure 1:
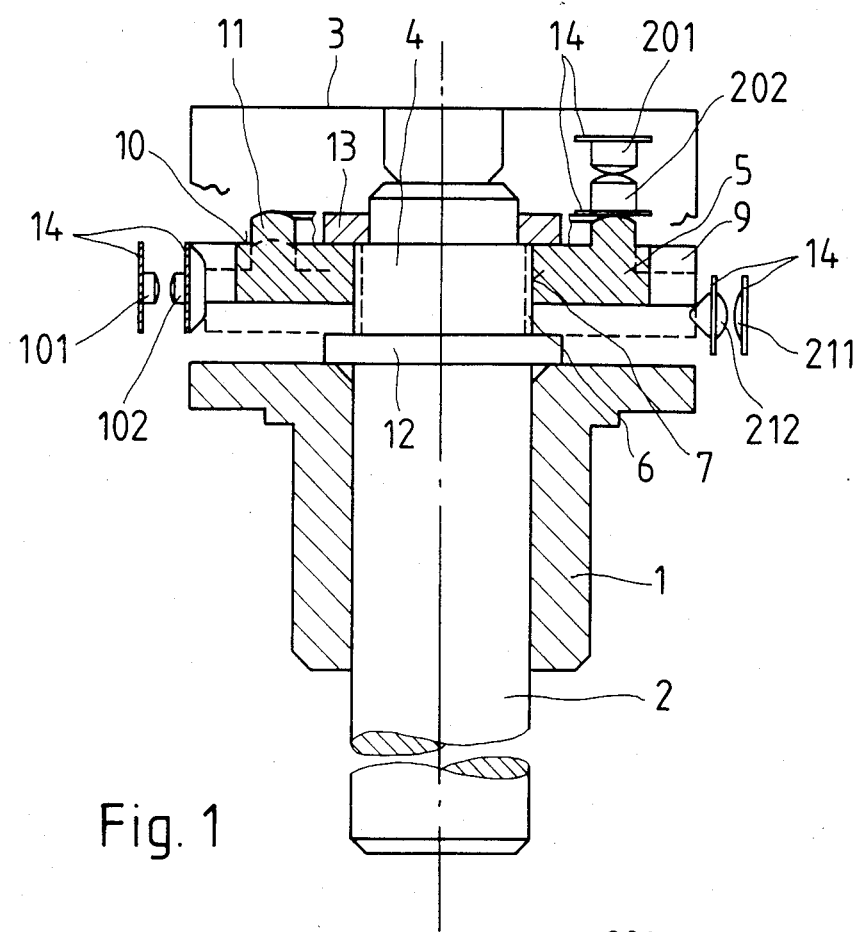
FIG. 1 illustrates in cross-section a pulse generator in accordance with the invention.
Figure 2:
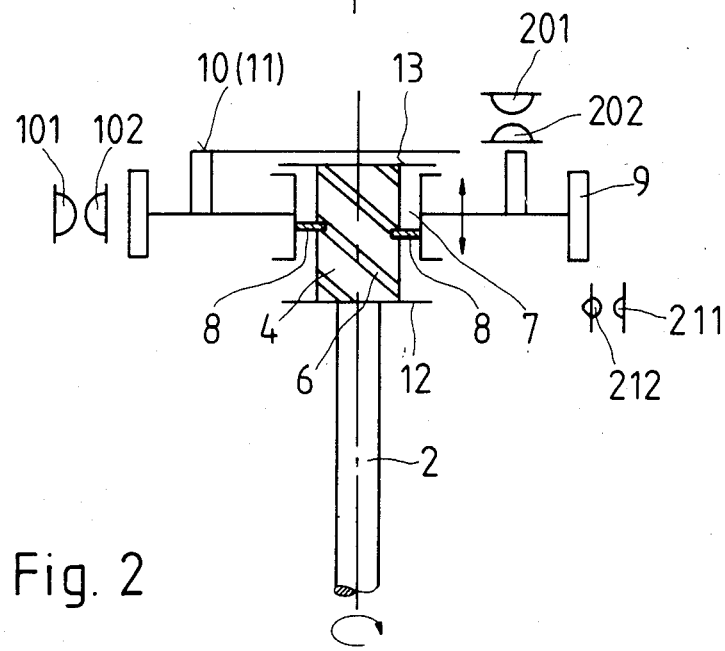
FIG. 2 illustrates the principle of operation of the invention with the aid of a multiple thread.

Turning to FIG. 1, bearing bushing 1 for rotary shaft 2 forms part of housing 3 which is shown schematically. Alternatively, bearing bushing 1 is capable of being attached to a part of the housing 3. Rotary shaft 3 is provided on its inside with a journal 4 on which a rotatably and axially displaceable toothed disk 5 is disposed. The journal 4 comprises an inclined plane in the form of a multiple thread 6. The bearing core 7 of the toothed disk is provided with a supporting plate surface in the form of a corresponding internal thread or one or more inwardly protruding pins 8 as shown in FIG. 2.

The toothed disk 5 has a toothing 9 which is provided for on its front surface. A pair of contacts 101, 102 is provided. Contact 102 is movable by the toothing 9 and in every axial position of the toothed disk 5 is in operative connection with a toothing 9. Upon rotation of the rotary shaft 2, contact 102 can be pushed by the tips of the teeth against the opposite contact member 101. Therefore, every tooth of the toothing 9 can effect the operation of the contacts 101, 102 and thereby cause the generation of a pulse.

Opposite the surface 10 of the toothed disk 5 or opposite an annular attachment 11 disposed thereon, a second pair of contacts is disposed. Moving contact member 202 can be pushed axially against contact 201 to close the contacts by the disk surface 10 or by the annular attachment 11. Contacts 201, 202 are closed or opened by toothed disk 5 being shifted either upward or downward via the coarse thread 6 depending on the direction of rotation of the rotary shaft 2 and because of the indexing effect of the contact member 102 with the toothing 9. Only when the axial displacement of toothed disk 5 has been effected or could have been effected depending on the direction of rotation, is the indexing of the toothed disk 5 overcome and the disk 5 is turned further by one or more teeth with the pair of contacts 101, 102 transmitting a corresponding number of pulses. The toothed disk 5 is axially displaceable or re-adjustable between two end positions defined by limiting stop elements designed as disks 12, 13, and upon meeting one of them it becomes rigidly coupled to the rotary shaft 2 and consequently, capable of rotating therewith.

Contacts 101, 102; 201, 202 are disposed in a known manner on flat or leaf springs 14 which are held in position inside the housing 3 and are provided with lead-in conductors.

The axially deflectable direction-of-rotation detection contacts 201, 202 may alternatively also be of the radially deflectable type. One such pair of contacts 211, 212 will then have to be attached in such a way that the operable contact member 212 lies within the range of action of the toothing 9. The pair of contacts 211, 212, however, is axially disposed such that it can only cooperate with the toothing 9 in one of the axial end positions, for example, in the position indicated by the lower dashed line in the drawing and not in the upper end position.

With the invention it is possible by simple means to effect both a direction-of-rotation detection and pulse transmission by a circular motion on the rotary shaft 2.

What is claimed is:

1. A pulse generator driven by a rotary shaft, said pulse generator generating pulses indicative of rotation of said shaft and providing signals indicative of the direction of rotation of said shaft, said pulse generator comprising:
   inclined plane means carried on said shaft;
   a toothed disk;
   supporting elements connected to said toothed disk for coupling said toothed disk to said inclined plane means;
   said disk being rotatable with said shaft and being displaceable in a first axial direction to a first axial position by said inclined plane means when said shaft rotates in a first direction and being displaceable in a second axial direction to a second axial position by said inclined plane means when said shaft rotates in a second direction;

a first pair of contacts for detecting the direction of rotation of said shaft, said first pair of contacts being actuatable by said toothed disk such that when said disk is in said first position said first pair of contacts are closed and when said disk is in said second position said first pair of contacts are open;

a second pair of contacts actuated by the toothing on said toothed disk independently of the axial position of said disk but in dependence on the angle of rotation of said shaft.

2. A pulse generator in accordance with claim 1, comprising:

first and second sliding displacement stops on said inclined plane means for defining said first and second axial positions, respectively; and wherein said toothed disk is in the form of an indexing disk and the indexing effect is so dimensioned such that said disk is only capable of being turned after being axially displaced to one of said first or second sliding displacement stops.

3. A pulse generator in accordance with claim 1 wherein, at least one contact member of said first pair of contacts is deflectable in said axial direction.

4. A pulse generator in accordance with claim 2 wherein, at least one contact member of said first pair of contacts is deflectable in said axial direction.

5. A pulse generator in accordance with claim 1 wherein, at least one contact member of both said first and said second pair of contacts is deflectable in a radial direction.

6. A pulse generator in accordance with claim 2 wherein, at least one contact member of both said first and said second pair of contacts is deflectable in a radial direction.

7. A pulse generator in accordance with claim 3 wherein, at least one contact member of both said first and said second pair of contacts is deflectable in a radial direction.

8. A pulse generator in accordance with claim 1 wherein, said inclined plane means comprises a journal on said shaft, said journal having a coarse thread; and said supporting means engaging said coarse thread.

9. A pulse generator in accordance with claim 2 wherein, said inclined plane means comprises a journal on said shaft, said journal having a coarse thread; and
said supporting means engaging said coarse thread.

10. A pulse generator in accordance with claim 3 wherein, said inclined plane means comprises a journal on said shaft, said journal having a coarse thread; and
said supporting means engaging said coarse thread.

11. A pulse generator in accordance with claim 4 wherein, said inclined plane means comprises a journal on said shaft, said journal having a coarse thread; and
said supporting means engaging said coarse thread.

12. A pulse generator in accordance with claim 5 wherein, said inclined plane means comprises a journal on said shaft, said journal having a coarse thread; and
said supporting means engaging said coarse thread.

13. A pulse generator in accordance with claim 6 wherein, said inclined plane means comprises a journal on said shaft, said journal having a coarse thread; and
said supporting means engaging said coarse thread.

14. A pulse generator in accordance with claim 7 wherein, said inclined plane means comprises a journal on said shaft, said journal having a coarse thread; and
said supporting means engaging said coarse thread.

15. A pulse generator in accordance with claim 8 wherein, said coarse thread is a multiple thread.

16. A pulse generator in accordance with claim 8 wherein, said supporting means comprises at least two inwardly projecting pins carried on said disk and engaging said thread.

17. A pulse generator in accordance with claim 9 wherein, said coarse thread is a multiple thread.

18. A pulse generator in accordance with claim 10 wherein, said coarse thread is a multiple thread.

19. A pulse generator in accordance with claim 9 wherein, said supporting means comprises at least two inwardly projecting pins carried on said disk and engaging said thread.

20. A pulse generator in accordance with claim 10 wherein, said supporting means comprises at least two inwardly projecting pins carried on said disk and engaging said thread.

* * * * *